April 5, 1927.
A. G. PROULX
1,623,751
STEERING GEAR ATTACHMENT
Filed March 23, 1926
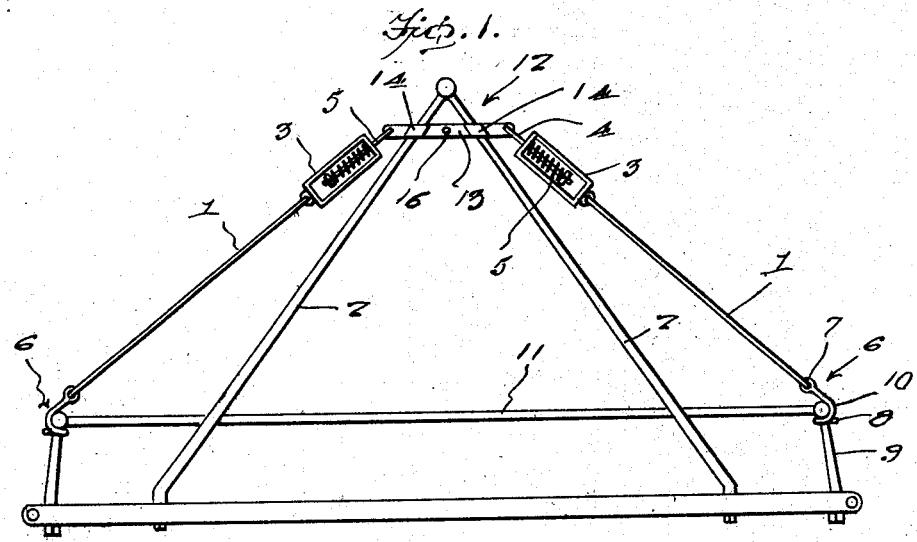
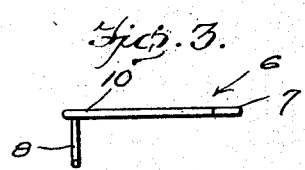
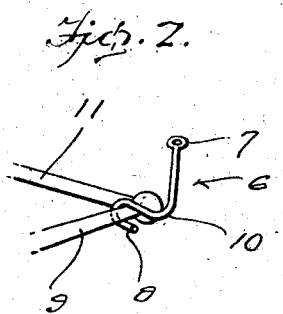
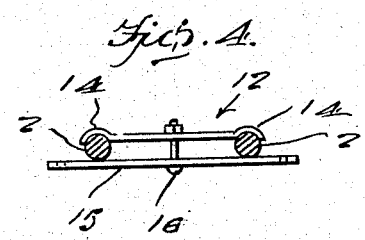
Inventor
A. G. Proulx
By Clarence A. O'Brien
Attorney Patented Apr. 5, 1927.

1,623,751

UNITED STATES PATENT OFFICE.

AMIE G. PROULX, OF ST. PAUL, MINNESOTA.

STEERING-GEAR ATTACHMENT.

Application filed March 23, 1926. Serial No. 96,830.

This invention relates to an attachment for the steering gear of an automobile of the Ford type, and the purpose of the invention is to provide a novel means for preventing excessive rattling of the details of the steering gear, to maintain the front wheels in true parallel relation and to thereby aid in steering the automobile.

Briefly the invention has reference to a clamp which is held by a single bolt on the converging ends of the radius rod, hooks which are connected with the spindle arms, and rods and spring connections between the clamp and hooks.

My principal aim is to generally improve upon inventions of this class by providing one of comparative simplicity and durability which may be readily placed in position for use by unskilled hands and which will effectively accomplish the purpose for which it has been designed.

Other features and advantages of the invention will become apparent from the following description and drawings.

In the accompanying drawings forming a part of this application and in which like numerals are employed to designate like parts throughout the same:

Figure 1 is a top plan view of conventional parts of an automobile of the type referred to showing the attachment associated therewith.

Figure 2 is a perspective view showing one of the hooks in detail.

Figure 3 is a side elevation of the hook.

Figure 4 is a detail view of the detachable clamp.

In carrying out the invention I provide a pair of duplicate rods 1 which are adapted to extend in forwardly diverging relation along side of the usual radius rods 2. Each rod 1 is connected at its rear end to a rectangular frame 3. A hook-bolt 4 is carried by this frame and a coil spring 5 is associated therewith for maintaining it under tension. The forward end of each rod is connected with an attaching hook. Each hook 6 is equipped with an eye 7 at one end and a downwardly offset right angularly disposed hook portion 8 at its opposite end. The hook portion is adapted to cooperate with the adjacent spindle arm 9. Adjacent the hook portion 8, the hook member 6 is bent into U-form as indicated at 10 to surround the joint between the spindle arm 9 and the spindle connecting rod 11. The forward end of the rod 1 is of course connected with the eye 7 in a suitable manner.

Referring now to Figure 4 the construction of the clamp 12 will be clear. As shown here the clamp comprises a top plate 13 which extends crosswise of the converging ends of the radius rods 2, this cross plate being formed at its opposite ends with curved seats 14 for reception of the radius rods. A bottom plate 15 extends across the under side of the radius rods and a retaining bolt 16 passes through the central portion of the two plates. By tightening the nut of the bolt, the two plates are clamped firmly against opposite sides of the radius rods. It will be noted that the free end portions of the bottom plate 15 are formed with openings in which the hooked ends of the aforesaid bolts 4 are fastened.

From the foregoing description it will be seen that the construction serves to place a yieldable stress upon the steering gear to maintain it in proper position. In so doing, the front wheels ordinarily are maintained in true parallelism and this aids greatly in the steering of the automobile.

In addition, the device serves to substantially eliminate chattering and rattling. The spring means is adjustable and as the device wears, it may be adjusted to bring about the proper tension. These and other features and advantages of the invention have doubtless been made apparent from the foregoing description and drawings. Inasmuch as persons will no doubt be able obtain a clear understanding by considering the description and drawings, a more lengthy description is thought to be unnecessary.

Minor changes coming within the field of invention claimed may be resorted to if desired.

Having thus described the invention, what I claim as new and desire to secure by Letters Patent is:—

An automobile steering gear attachment of the class described comprising a pair of hooks adapted to be detachably associated with the spindle arms and spindle connecting rods, a pair of rearwardly diverging rods pivotally connected with said hooks, frames to which the rear ends of said rods are connected, spring pressed bolts slidably mounted upon said frames, said bolts having hooks at their rear ends, a radius rod clamp with which the hooked ends of said bolts are detachably connected, said clamp comprising top and bottom plates associated with the radius rod, the plates being connected together by a single bolt and the opposite end portions of the top plates being formed with seats for reception of the upper portion of the radius rod.

In testimony whereof I affix my signature.

AMIE G. PROULX.